(12) United States Patent
Deng et al.

(10) Patent No.: US 6,778,212 B1
(45) Date of Patent: Aug. 17, 2004

(54) DIGITAL IMAGE SENSOR WITH ON-CHIP PROGRAMMABLE LOGIC

(75) Inventors: Zhonghan John Deng, Mountain View, CA (US); David Xiao Dong Yang, Mountain View, CA (US); Odutola Oluseye Ewedemi, San Jose, CA (US)

(73) Assignee: Pixim, Inc., Mountain View, CA (US)

(*) Notice: Subject to any disclaimer, the term of this patent is extended or adjusted under 35 U.S.C. 154(b) by 829 days.

(21) Appl. No.: 09/665,523

(22) Filed: Sep. 19, 2000

Related U.S. Application Data

(60) Provisional application No. 60/184,095, filed on Feb. 22, 2000, and provisional application No. 60/184,096, filed on Feb. 22, 2000.

(51) Int. Cl.[7] .................. H04N 5/228; H04N 5/335; H04N 3/14; H01L 27/00
(52) U.S. Cl. ............... 348/222.1; 348/294; 348/308; 250/208.1
(58) Field of Search .................. 348/304, 374, 348/231.3, 231.6, 294, 296, 301, 222.1, 308; 250/208.1

(56) References Cited

U.S. PATENT DOCUMENTS

| | | | |
|---|---|---|---|
| 5,461,425 A | | 10/1995 | Fowler et al. ........... 348/294 |
| 5,801,657 A | | 9/1998 | Fowler et al. ........... 341/155 |
| 5,883,830 A | * | 3/1999 | Hirt et al. ............... 348/294 |
| 6,362,767 B1 | * | 3/2002 | Yang et al. .............. 341/155 |
| 6,452,632 B1 | * | 9/2002 | Umeda et al. ........... 348/294 |
| 6,587,145 B1 | * | 7/2003 | Hou ........................ 348/297 |
| 6,606,122 B1 | * | 8/2003 | Shaw et al. .............. 348/294 |
| 2002/0101528 A1 | * | 8/2002 | Lee et al. ................. 348/304 |
| 2002/0140834 A1 | * | 10/2002 | Olding et al. ........... 348/294 |
| 2002/0186312 A1 | * | 12/2002 | Stark ....................... 348/302 |
| 2003/0151680 A1 | * | 8/2003 | McDermott et al. .... 348/231.6 |

OTHER PUBLICATIONS

Fossum; "Digital Camera System on a Chip"; 1998, IEEE.*
Patent application No. 09/274,202, entitled: "Methods for Simultaneous Analog–to–Digital Conversion and Multiplication", D. Yang et al., filed Mar. 22, 1999.
Patent application No. 09/567,786, entitled: "Multiple Sampling Via a Time–Indexed Method to Achieve Wide Dynamic Ranges", D. Yang et al., filed May 9, 2000.

* cited by examiner

*Primary Examiner*—Wendy R. Garber
*Assistant Examiner*—John Villecco
(74) *Attorney, Agent, or Firm*—Beyer Weaver & Thomas, LLP; Joe Zheng

(57) ABSTRACT

An image sensor, including a substrate having formed thereon by a CMOS process a digital sensor array having a plurality of digital pixel sensors which output analog signals corresponding to a desired image. The digital sensor array further includes supporting circuitry for converting the analog signals produced by the digital pixel sensors to digital signals corresponding to the desired image. Filter circuitry, for converting the digital signals to digital values representative of the light intensity impinging upon the plurality of digital pixel sensors, is also formed on the substrate using CMOS fabrication processes. Memory devices, including a data memory, a threshold memory, and a time index memory are formed on the substrate using CMOS fabrication techniques. A clock circuit is also formed on the substrate using CMOS fabrication processes. Programmable logic structures are formed on the substrate using CMOS fabrication processes. The programmable logic structure can be configured into a variety of circuitry or routing so as to facilitate customization or specialization of the image sensor.

38 Claims, 6 Drawing Sheets

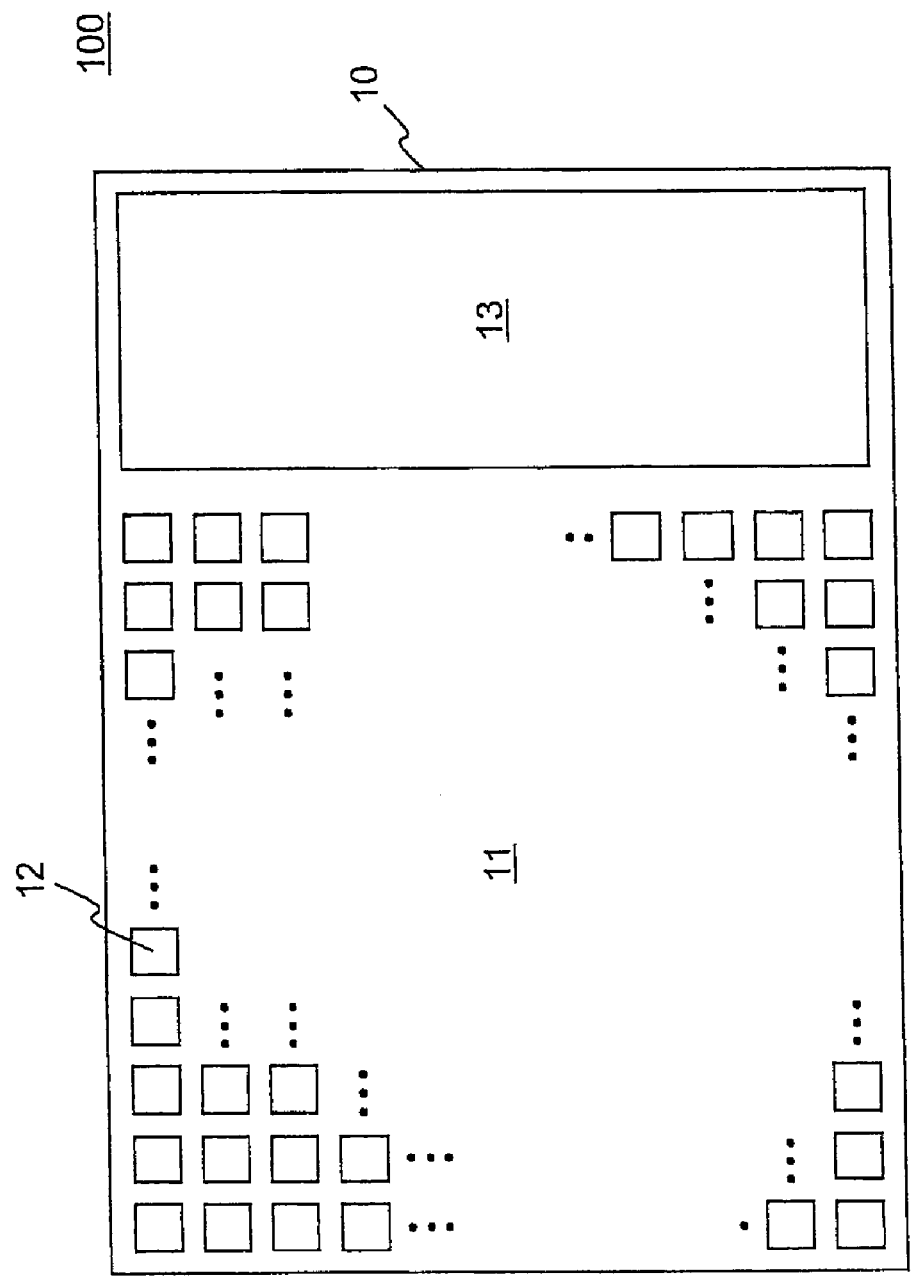

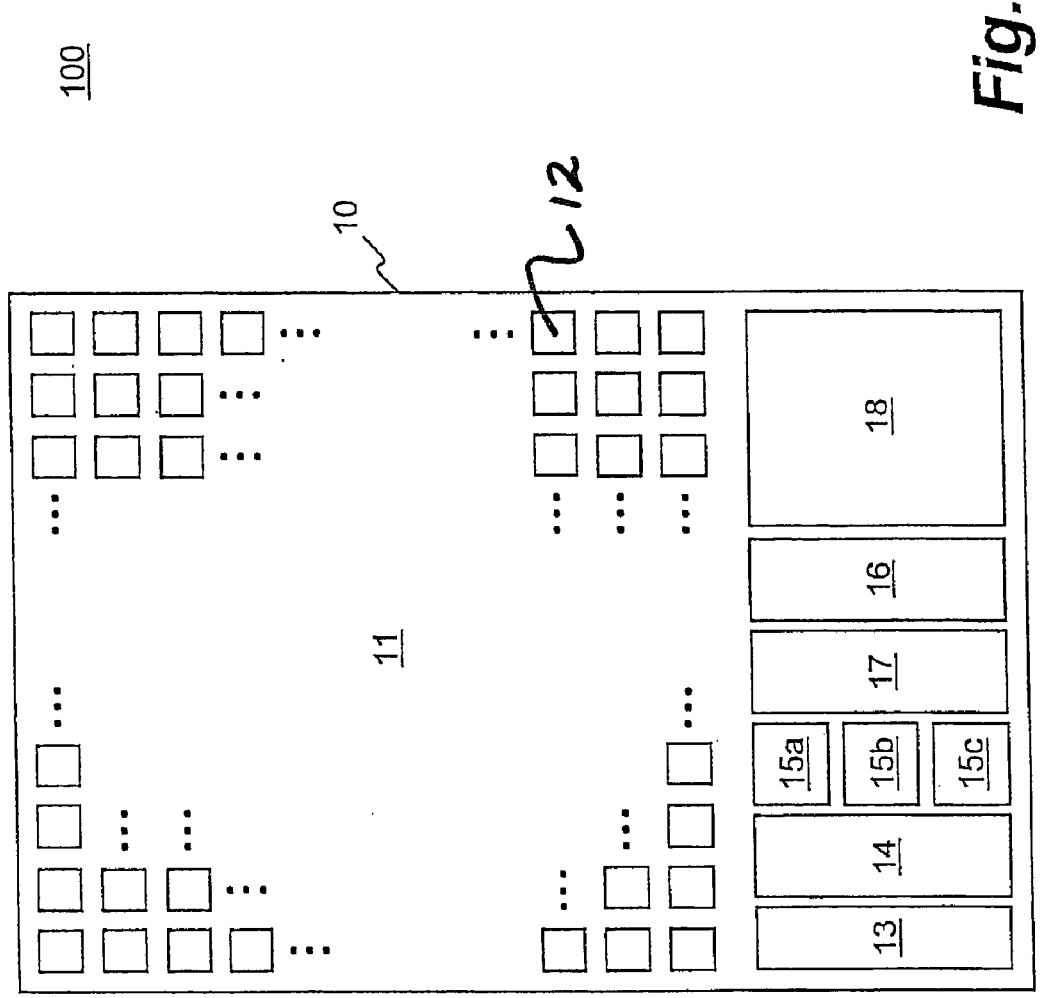

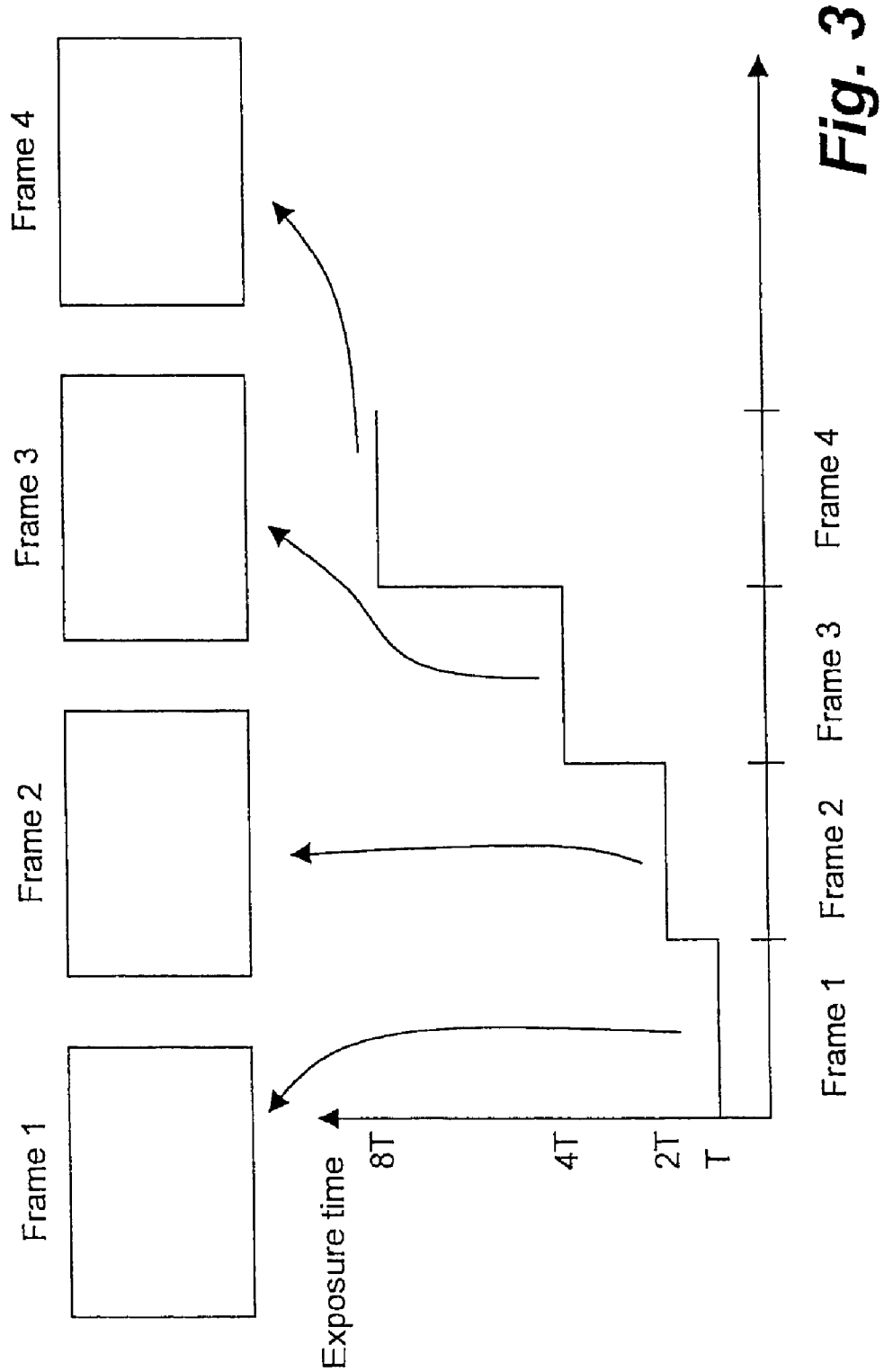

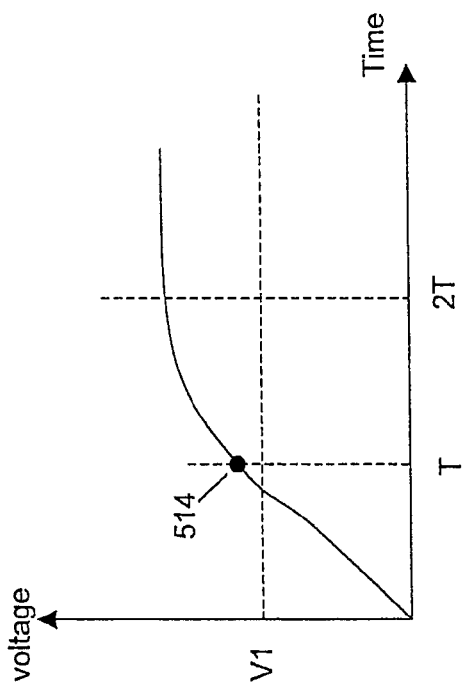
*Fig. 4B*
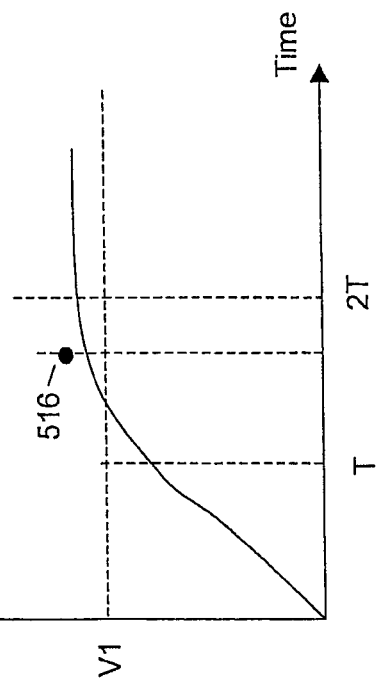
*Fig. 4C*
*Fig. 4A*

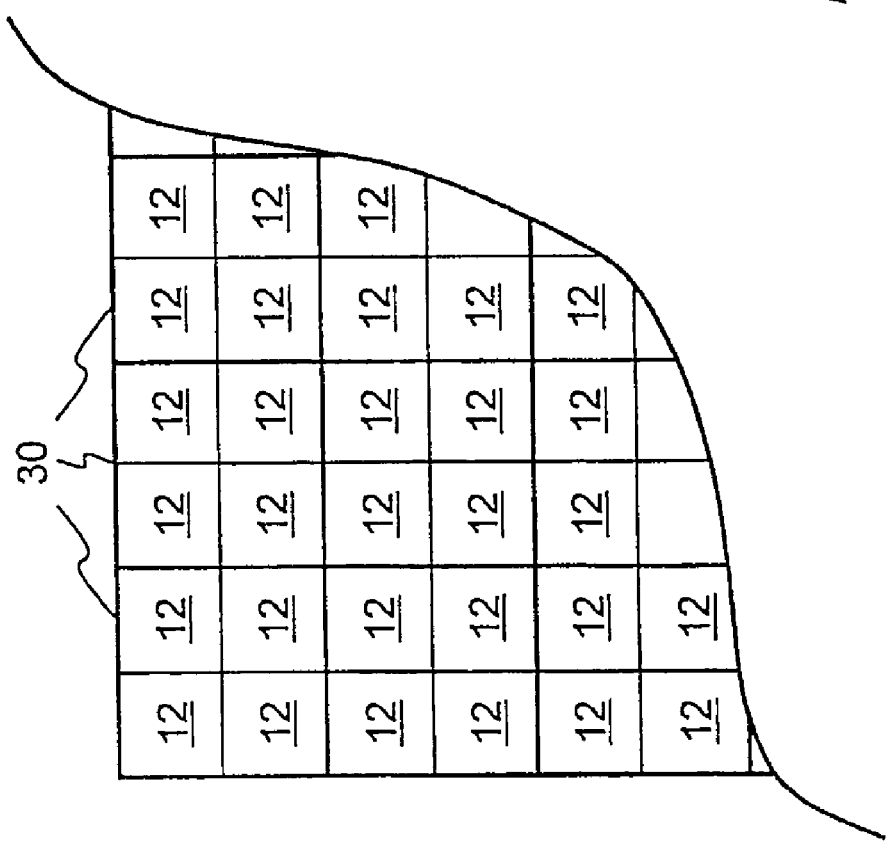

DIGITAL IMAGE SENSOR WITH ON-CHIP PROGRAMMABLE LOGIC

RELATED APPLICATIONS

This application is related to pending U.S. patent application Ser. No. 09/274,202, filed on Mar. 22, 1999, and Ser. No. 09/567,786 filed on May 9, 2000, each of which is hereby incorporated by reference. This application claims priority from Provisional Patent Application No.'s 60/184, 095 and 60/184,096, both filed on Feb. 22, 2000, and each of which is hereby incorporated by reference.

TECHNICAL FIELD

The invention described herein relates to image sensor systems. In particular, the invention relates to image sensor architectures incorporating programmable logic devices together with image sensors on a single semiconductor chip.

BACKGROUND

The present invention relates to improvements in digital camera technology. Digital camera technology is a rapidly growing field with expanding commercial viability. Digital cameras focus the light from optical images onto image sensors which convert the light into electrical signals that correspond to the optical image. Conventional digital camera technologies utilize charged-coupled devices (CCD) or complementary Metal-Oxide semiconductors (CMOS) to detect light and thereby create digital images. Such CCD or CMOS photosensors translate received light into electronic charging signals that are digitized and processed by a digital camera to produce a digitally storable image. Additionally, color images can be created. For example, red, green, and blue filters allow light to be sampled in each separate spectrum. By combining and evaluating the various data collected in each spectrum, a color image can be created.

Unfortunately, one of the drawbacks of such digital camera technology is that it is as yet unable to obtain the same degree of resolution currently possible with conventional chemically based photographic techniques. Conventional film technologies, which are limited only by the granularity of the chemically based film, generally have a resolution measured in the tens of millions of pixels. In contrast, image sensors currently used in most commercially viable digital cameras feature resolutions of slightly more than one or two million pixels.

Additionally, digital photography suffers from a limited dynamic range. Frequently, the dynamic range of the image sensors used in digital photography is not as wide as that obtainable by conventional chemically based photographic techniques. Often the dynamic range of a digital image sensor is not wide enough to capture scenes having both highlights and dark shadows. This is especially problematic in CMOS based image sensors which, in general, have lower dynamic range than CCD's.

There are many applications for image sensors, each requiring different auxiliary supporting circuits to operate hence demanding various interface or functions from the image sensors. Designers of the image sensors are burdened with various requirements from the different auxiliary supporting circuits. Thus, there is a need for image sensors which incorporate these varying interfaces or functions on a single integrated circuit (i.e., on a common substrate). Furthermore, there is a need for an image sensor that can be adapted to a wide range of functional parameters or configurations. In particular, there is a need for image sensors which incorporate these and other functionalities all on a single substrate along with a digital pixel array.

SUMMARY OF THE INVENTION

In accordance with the principles of the present invention, a single-chip digital image sensor embodiment comprises a digital sensor array having a plurality of pixel sensors for outputting analog signals representing at least one image and having supporting circuitry for receiving and converting the analog signals to digital image information and a programmable logic structure, the programmable logic structure being programmable to provide additional logic and routing for use with said digital sensor array.

A further image sensor embodiment comprises a substrate having a digital sensor array formed thereon. The digital sensor array has a plurality of digital pixel sensors for outputting analog signals representing at least one image and includes supporting circuitry for receiving and converting the analog signals to digital signals. Additionally, the substrate has at least one programmable logic structure formed thereon.

In another embodiment, an image sensor comprises a substrate having formed thereon a digital sensor array, wherein the digital sensor array is formed using CMOS processes. The digital sensor array includes a plurality of light sensitive digital pixel sensors, which output analog signals corresponding to an image, and having supporting circuitry for converting the analog signals to digital signals corresponding to the image. Additionally, the substrate has formed, by CMOS processes thereon, decoder circuitry which receives the digital signals from the digital sensor array and converts the digital signals to adjusted digital values representative of the light intensity impinging upon the plurality of light sensitive digital pixel sensors. The image sensor further includes a plurality of filters which receive the adjusted digital values from the decoder circuitry and from at least one memory. The at least one memory stores the digital values provided by the filters, and the at least one memory is formed on the substrate using CMOS processes. The image sensor also includes a control circuit which selectively transfers the digital values from the plurality of filters to memory addresses within the at least one memory, the control circuit being formed on the substrate using CMOS processes. The image sensor also including the at least one programmable logic structure. The programmable logic structure is formed on the substrate using CMOS processes. Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which:

FIG. 1 is a block diagram of an image sensor embodiment in accordance with the principles of the present invention.

FIG. 2 is a block diagram of another image sensor embodiment in accordance with the principles of the present invention.

FIG. 3 graphically illustrates an exemplar relationship between exposure time and image frames.

FIG. 4a is a block diagram showing the memory states of data memory, threshold memory, and time index memory as used in an embodiment of the present invention.

FIGS. 4b and 4c graphically depict threshold energy and total incident energy on a digital pixel sensor embodiment of the present invention.

FIG. 6 is a close-up depiction of a portion of a sensor array including groups of pixels constructed in accordance with the principles of the present invention.

DETAILED DESCRIPTION OF THE PREFERRED EMBODIMENTS

Figure 5:
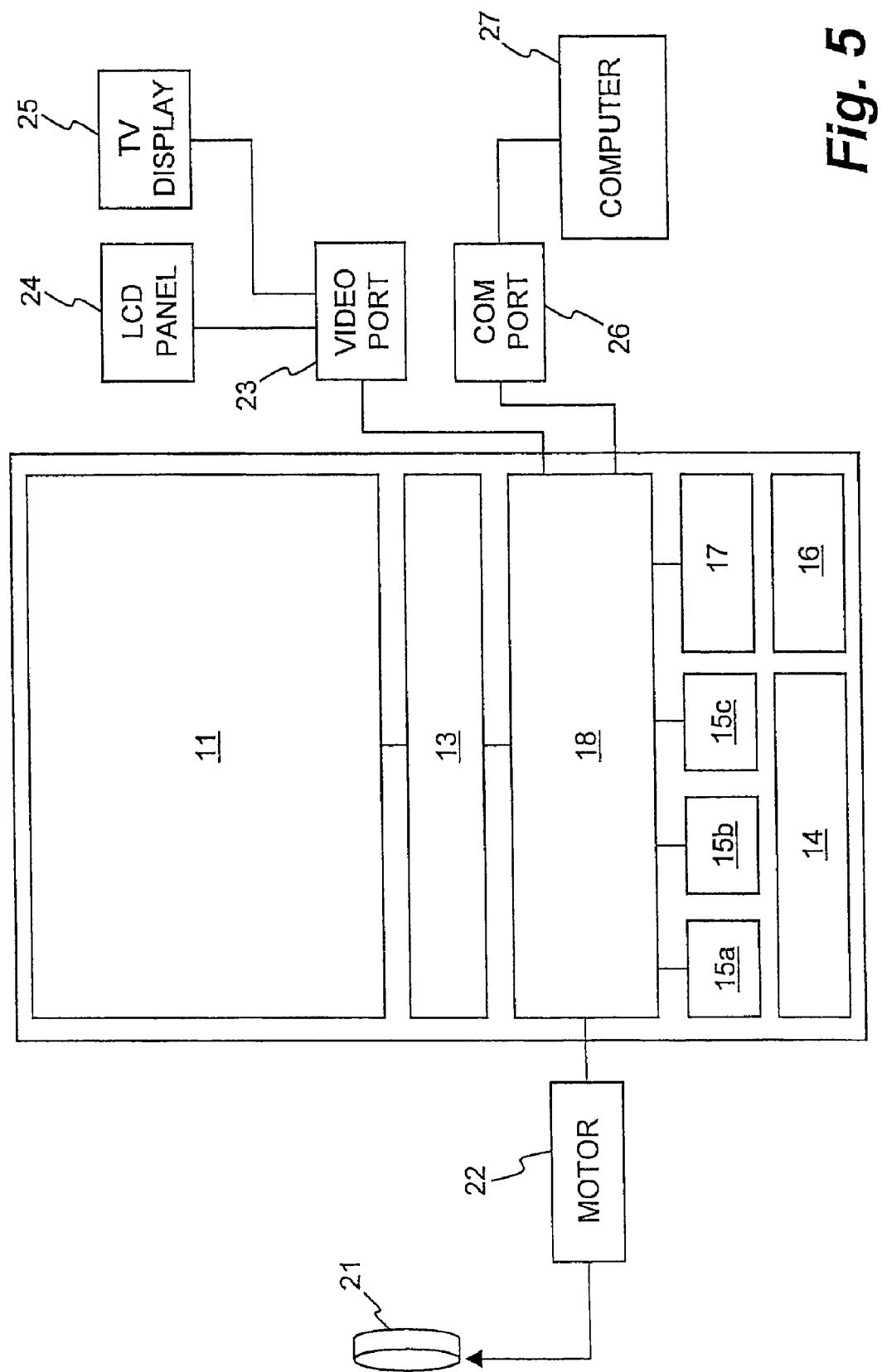
FIG. 5 is a block diagram of an image sensor embodiment constructed in accordance with the principles of the present invention and showing some typical interconnections to peripheral functions and peripheral equipment.

A digital pixel sensor (DPS) integrated with a programmable logic on a single chip is disclosed. The programmable logic may include, but is not limited to, a simple programmable logic device (SPLD) and a higher density complex programmable logic device (CPLD), a flash programmable logic, and an EPROM programmable logic. The improved digital pixel sensor considerably reduces complexities of auxiliary supporting circuitry to operate. The present invention can be advantageously employed in various imaging applications. As a result, a single design of digital pixel sensors can be simply and externally programmed through the on-chip programmable logic to suit various auxiliary supporting circuitry and needs.

The detailed description of the invention is presented largely in terms of procedures, steps, logic blocks, processing, and other symbolic representations that directly or indirectly resemble the operations of devices in one embodiment. These process descriptions and representations are typically used by those skilled in the art to most effectively convey the substance of their work to others skilled in the art. Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

FIG. 1 depicts an embodiment in accordance with the principles of the present invention. An image sensor 100 is described. The image sensor 100 can be used in a wide variety of digital image capturing devices (e.g., digital cameras or digital video cameras). The image sensor 100 includes a semiconductor substrate 10. A digital sensor array 11 and a programmable logic device 18 are formed on the substrate 10. The substrate 10 can be fabricated using, for example, CMOS processing techniques (also referred to as CMOS fabrication) known to those having ordinary skill in the art. CMOS fabrication allows both the digital sensor array 11 and other circuit structures including, but not limited to, the programmable logic device 18 to be formed on the same substrate 10.

The digital sensor array 11 features a plurality of digital pixel sensors 12. The digital pixel sensors 12 include pixel level analog-to-digital conversion circuitry. Suitable circuitry for implementing the digital sensor array 11 is described in a patent to Fowler et al., U.S. Pat. No. 5,461,425, which is hereby incorporated by reference. The digital pixel sensors 12 can be fabricated, preferably using CMOS fabrication techniques known to those in the art. Typically, the digital sensor array 11 is provided as a two dimensional array of digital pixel sensors 12. Additionally, the digital sensor array 11 can be used in color applications. For example, red, green, and blue filters can be used to selectively filter light received by the digital pixel sensors 12 to produce spectrum sensitive exposure images which can be integrated to form color pictures.

To address the need for image sensors, which are readily adaptable to the needs of a variety of different customers or applications, a programmable logic device 18 is formed directly onto the same substrate as the digital sensor array 11. In other words, the image sensor 100 is a single integrated circuit (single chip) which includes at least the digital sensor array 11 and the programmable logic device 18. Because each customer may need the image sensor 100 for widely differing applications, the programmable logic device 18 is advantageous because it greatly facilitates customization of the image sensor 100 for the different applications. Programmable logic devices can be adapted to support a wide range of functional parameters as well as logic and routing configurations. The programmable logic device 18 can be formed with a number of different sizes using processes (e.g., CMOS) known in the art. Accordingly, the image sensor 100 can be programmed by the customer to accomplish a variety of purposes. Through use of CMOS processes, the programmable logic device 18 and image sensor arrays 11 can be formed all on a single substrate 10. Alternatively, two CMOS substrates may be formed, one for the sensor and the other for sensor supporting circuitry including the programmable logic device 18. Through a bonding process, a stacked or sandwiched programmable image sensor can be formed.

FIG. 2 illustrates another implementation of the principles of the present invention. An image sensor 100 is described. The image sensor 100 includes a semiconductor substrate 10. The substrate 10 is preferably fabricated using CMOS processing. In addition to a digital sensor array 11 formed on the substrate 10, other circuit structures are formed on the same substrate 10. Other circuit structures which may advantageously be fabricated on the CMOS substrate 10 include, but are not limited to, one or more of the following: filter/multiplexing circuitry 13, controller circuitry 14, memory 15, decoder circuitry 16, and clock driver devices 17. It should also be noted that the digital sensor array 11 can be fabricated over other underlying circuit structures (e.g., 13, 14, 15, 16, 17) using, for example, CMOS fabrication techniques known to those in the art.

One type of programmable logic device (PLD) 18, which may be incorporated into embodiments of the present invention, is a Simple Programmable Logic Device (SPLD), which is the smallest and least expensive type of programmable device. Such devices typically include 4–22 macrocells. These devices are frequently identified by their tradenames; e.g., Programmable Array Logic or Generic Array Logic. A more preferred type of structure is a so-called Complex Programmable Logic Device (CPLD), which is equivalent to many SPLD's having hundreds of macrocells. The semiconductor fabrication techniques (including CMOS fabrication) used to form CPLD's on the substrate 10 are well known to those having ordinary skill in the art. Because of their fast pin-to-pin performance, CPLD's are ideally suited to control applications. In fact, depending on the needs of the image sensor 100 user, the controller circuitry 14 may be replaced by a PLD 18. The inventors contemplate the use of either one time programmable PLD's 18 or erasable and reprogrammable PLD's. PLD's 18 can advantageously be programmed in-system on the fabricated substrate 10. Also usable as a PLD 18 are Field Programmable Gate Arrays (FPGA), which are also known as pASIC's (programmable application specific integrated circuits) or Logic Cell Arrays (LCA), as well as other numerous tradenames. FPGA's typically offer higher logic capacities than SPLD or CPLD structures. One advantage of FPGA's is that they may be provided as SRAM-based devices which are inherently reprogrammable even in-system. Advantageously, they can be programmed using an external configuration memory source. The desired program is held in the external configuration memory source and the configured memory is downloaded into the FPGA. Such configuration times are typically less than 200 ms. One time programmable FPGA's can also be fabricated on the image sensor 100. An additional advantage of FPGA's is that they can be fabricated having core architectures already in place with only the peripheral functions requiring programming. Another related PLD 18 is a Field Programmable Interconnect Device (FPID), which is programmed to selectively interconnect the various pins on such devices. Such devices offer a convenient way to interconnect various devices on an image sensor 100.

The digital sensor array 11 and the other circuit structures (e.g., 13, 14, 15, 16, 17) can be integrated into very accurate and highly sensitive light detection devices with exceptional dynamic range. For example, in one embodiment, an image may be sampled several times and the data combined to construct high dynamic range images. Referring to FIG. 3, a series of "frames" within an exposure can be recorded by the digital image sensor and its supporting circuitry to create an enhanced dynamic range image. The following example illustrates one method of accomplishing such an enhanced dynamic range image. A first image (Frame 1) at a first exposure time T is generated. A second image (Frame 2) at a second exposure time 2T is generated. A third image (Frame 3) at a third exposure time 4T is generated. A fourth image (Frame 4) at a fourth exposure time 8T is also generated. As many images as desired can be created. These images can then be processed together to obtain digital images with enhanced dynamic ranges. It should also be noted that the time period between frames can be varied in accordance with other processing schemes, e.g., T, 2T, 3T, and 4T.

One such application of a single chip device of the type shown in FIG. 2 operates as follows. An image is focused on the digital sensor array 11 such that light from different portions of the image impinge on various digital pixel sensors 12 corresponding to the image. Typically, each digital pixel sensor 12 produces an analog electrical signal which is related to the intensity of light impinging on the digital pixel sensor 12. The analog signals from each digital pixel sensor 12 are converted into serial bit streams of digital signal output from dedicated analog to digital conversion circuits which are clocked using a common clock driver 17. The clock driver 17 is also preferably formed on the substrate 10. The serial bit streams are processed by the decoder circuitry 16, which outputs signal to the filter circuitry 13 (also preferably formed on the substrate 10). The filter circuitry 13 receives a signal representative of the intensity of light impinging on the digital pixel sensors 12. The serial bit streams are processed over a frame period (over a period of time) which is related to a clock cycle. The frame can comprise several clock cycles.

After each clock cycle, one bit is latched at the output of each of the digital pixel sensors 12. These bits, in the preferred embodiment, are transferred from the pixel sensors 12 to the filter circuitry 13 after each clock cycle. Such transfer is facilitated by the controller circuitry 14. For example, the digital sensor array 11 features rows of individual digital pixel sensors 12. The output of each of these rows can be addressed in sequence, using the controller circuitry 14 until all rows of the digital sensor array 11 have been addressed. Upon addressing each row, the one-bit output of each of the digital pixel sensors 12 in each row of digital pixel sensors is processed through the filter circuitry 13. The filter circuitry 13 processes the bit stream from each digital pixel sensor 12 to generate an eight-bit value which corresponds to the average intensity of light impinging on the respective digital pixel sensor 12 during that frame. These eight-bit values may then be output from the filter circuitry 13, which includes a suitable multiplexer or shift register, and temporarily stored in a data memory 15a for storing the digital signal information. In one implementation, this data memory 15a can act as a frame buffer where light intensity values are in the data memory 15a, and then are sequentially accessed to control the light output of corresponding pixels in a monitor.

One specific embodiment of the image sensor 100 can operate as follows. Assume that the filter circuitry 13 includes 64 separate filters for converting the bit streams input from the digital pixel sensors 12 (multiplexers in the filter circuitry 13 may reduce the number of filters). After a row of the digital pixel sensors 12 has been addressed, the controller circuitry 14 accesses previously stored eight-bit values stored in the data memory 15a, which correspond to each digital pixel element in the appropriate row, and loads the previous value into a corresponding filter in the filter circuitry 13. Conventional memory addressing techniques and circuitry may be used for this process. The output of the digital pixel sensors 12 is then applied to a corresponding filter containing the previous eight-bit value for that digital pixel sensor 12. A comparison of the new value and old value is then made. If the new value exceeds a threshold value, the filter element circuitry 13 updates the previous eight-bit value with a new single bit of information to generate a new eight-bit value. The now updated eight-bit value is transferred back into the data memory 15a under control of the controller circuitry 14.

In accordance with another aspect of the invention, after the first frame of data is read out into the data memory 15a, a second frame of data is selectively read out into the data memory 15a to improve, update, or enhance the values contained therein. Selection is controlled by the contents of a corresponding threshold memory 15b. Additionally, a time index memory 15c can be used to increase the dynamic range of the image sensor 100 of the present invention.

In one embodiment shown in FIG. 4a, a pair of exemplary threshold memory cells 502 and 504, a pair of exemplary time index memory cells 506 and 508, and a pair of corresponding data memory cells 510 and 512 are shown. Referring to FIGS. 4a and 4b, after a first exposure time T a resultant signal 514 exceeds a predefined threshold value $V_1$ and a flag is generated. Such a flag can be used as an indicator that the threshold value $V_1$ has been exceeded. The flag may be assigned a value, for example, "1", which indicates that the threshold value has been exceeded and is therefore stored in the threshold memory cell 502. The exposure time (in this case T) is stored in the time index memory cell 506 and the resultant signal emitted by the digital pixel sensor 12 (or more correctly the eight-bit digital representation thereof, shown here as the value 240) is stored in the data memory cell 510. The threshold value $V_1$ is usually set such that further exposure of the digital pixel sensor 12 to light produces the resultant signal 514 which causes the digital pixel sensor 12 to become saturated. Therefore, in view of the flag ("1") in the threshold memory cell 502, there is no need to enhance the value stored in the data memory cell 510 after the first exposure at time T. However, a further update of the data memory cell 510 could cause loss of the data contained therein as the next value would be a saturated value.

As described in FIG. 4c in combination with FIG. 4a, the resultant signal 516 produced by an adjacent digital pixel sensor 12 is below the threshold value $V_1$ at time T. Therefore, the threshold memory cell 504 does not store the flag "1" (assuming that this cell 504 was reset "0" when the operation starts). This permits the corresponding data memory cell 512 to be updated or enhanced with a new value that results from a next exposure (for example, at time 2T). Thus, at time 2T a value of 50 can be stored in the data memory cell 512. The exact contents stored in cells 502, 504, 506 or 508 are largely dependent on implementation preference.

An advantage of the present invention is that each of the digital pixel sensors 12 are prevented from becoming saturated and overriding useful information stored in memory. The contents in the time index memory are used individually so that the final image can be regenerated correctly. This allows the contents in the memory to be updated properly after additional exposure times, or allows individual time frames of data to be combined properly.

Another advantage of providing the PLD 18 on the substrate 10 is that one or more of the previously outlined functioning structures including, but not limited to: filter circuitry 13, controllers 14, data memory 15a, threshold memory 15b, time index memory 15c, decoders 16, and clock circuitry 17 can all be programmed into the PLD 18 formed on the substrate 10.

Additionally, the PLD 18 offers the possibility of bringing a host of previously off-chip functions onto the image sensor 100. For example, referring to the embodiment pictured in FIG. 5, some applications of the PLD 18 are shown. For example, a lens 21 can be controlled using the PLD 18. The PLD 18 can be programmed to control a motor 22 which adjusts the zoom, focus, or aperture of the lens 21, commonly off-chip functions. Processing and routing can be programmed into the PLD 18 so as to route signals to a video port 23, which provides signals to image processing sources including, but not limited to, an LCD display 24 or a TV display 25. The PLD 18 can also be configured to route and process signals for output via a COM port 26. The signals can be input into, for example, a computer 27 for downloading and further processing.

Also, the PLD 18 can be configured as a memory controller (replacing the controller 14 of FIG. 2 or 5). Such a controller can be used in conjunction with data memory 15a, threshold memory 15b, time index memory 15c, filter circuitry 13, and clock circuitry 17 to implement a time indexed method of processing image information such as taught in U.S. patent application Ser. No. 09/567,786, entitled: Multiple Sampling Via a Time-Indexed Method to Achieve Wide Dynamic Ranges, invented by D. Yang et al. and filed on May 9, 2000, referenced herein. Such a controller configuration can be used to increase the dynamic range of the digital sensor array 11. It should be noted that the PLD 18 itself can operate as a memory device if configured to do so. Furthermore, the PLD 18 can be configured as a timing control device, such as a clock or a clock in combination with a memory controller. Additionally, PLD's 18 can be used to introduce added capacity and functionality to other circuit elements on the image sensor 100.

The PLD 18 can also be configured to adjust the pixel resolution of the image sensor 100. For example, rather than processing each digital pixel sensor 12 separately to obtain the highest possible resolution, the PLD 18 can be configured to process the digital pixel sensors 12 in groups 30 of digital pixel sensors 12. FIG. 6 shows a portion of digital sensor array 11 which includes a plurality of digital pixel sensors 12. The plurality of digital pixel sensors 12 are shown in groups 30 of four digital pixel sensors 12. The groups 30 are processed together, for example, by summing the electrical response of the four digital pixel sensors 12 and processing the summed electrical response as if it were a single "pixel". Such processing leads to lower resolution but advantageously increases the speed at which signal processing can be accomplished. This leads to faster read out times. Additionally, the precision of the bits which quantify the amount of light received by the digital pixel sensors 12 can be adjusted. For example, certain wavelengths can be accentuated or the dynamic range of the bits can be expanded. The methods of accomplishing such adjustments to resolution, readout time, bit precision, and bit dynamic range are known to those having ordinary skill in the art and will not be discussed here now.

In another application of the principles of the present invention, the PLD 18 can be configured to transform a digital image stored in memory into a format readable by a fax machine. Also, the PLD 18 can be configured such that a bar code image detected by the digital sensor array 11 can be read and utilized.

In accordance with the principles of the present invention, the PLD 18 can be configured to customize a digital sensor array 11 to incorporate a customer's (e.g., a manufacturer or end user's) specific needs or applications. For example, a specific protocol can be installed on the PLD 18 which can operate manufacturer specific or proprietary data processing. The PLD 18 can be configured to operate customer specific functions unique to that customer. Proprietary applications can be implemented using the PLD 18.

The present invention has been particularly shown and described with respect to certain preferred embodiments and specific features thereof. However, it should be readily apparent to those of ordinary skill in the art that various changes and modifications in form and detail may be made without departing from the spirit and scope of the invention as set forth in the appended claims. Further, reference in the claims to an element in the singular is not intended to mean "one and only one" unless explicitly stated, but rather, "one or more". Furthermore, it should be explicitly noted here that, by their very nature, programmable logic devices are open to a wide range of applications within the understanding of one having ordinary skill in the art. The present invention is not intended to limit the applications to which the programmable logic devices described herein are to be applied. The examples provided herein are intended to be illustrative rather than limiting. The inventions illustratively disclosed herein may be practiced without any element which is not specifically disclosed herein.

We claim:

1. An image sensor, comprising:
   a substrate having formed thereon a digital sensor array;
   the digital sensor array having a plurality of digital pixel elements, each comprising a photosensor and an analog-to-digital conversation circuit, the photosensor producing an analog signal when the image sensor is exposed to light, the analog-to-digital conversation circuit receiving the analog signal and generating a digital representation thereof;

the substrate having formed thereon at least one programmable logic structure programmable externally to control operations of the digital sensor array so that the digital representation can be output from the image sensor as desired; and at least one memory formed on the substrate, wherein the at least one memory includes a data memory for storing digital signal information; and a threshold memory for storing threshold values for the digital signal information.

2. The image sensor of claim 1 further including at least one memory formed on the substrate, the at least one memory for receiving said digital representation.

3. The image sensor of claim 1 wherein the digital sensor array, an at least one memory, and the at least one programmable logic structure are each formed on the substrate using CMOS fabrication techniques.

4. The image sensor of claim 3 wherein the at least one programmable logic structure includes the at least one memory.

5. The image sensor of claim 3 wherein the at least one programmable logic structure is selected from the group consisting of Simple Programmable Logic Devices, Complex Programmable Logic Devices, Field Programmable Gate Arrays, and Field Programmable Interconnect Devices.

6. The image sensor of claim 3 wherein the at least one programmable logic structure is configured to adjust pixel resolution of the image sensor.

7. The image sensor of claim 3 wherein the at least one programmable logic structure is configured to adjust bit precision of the plurality of digital pixel sensors of the digital sensor array.

8. The image sensor of claim 3 wherein the at least one programmable logic structure is programmed to adjust the resolution of the digital sensor array.

9. The image sensor of claim 3 wherein the at least one programmable logic structure is programmed to increase the processing speed of images detected with the digital sensor array.

10. The image sensor of claim 3 wherein the at least one programmable logic structure is programmable to accommodate customer specified functions.

11. An image sensor comprising:
a substrate having formed thereon a digital sensor array wherein the digital sensor array is formed using a CMOS fabrication process;
the digital sensor array including a plurality of light sensitive digital pixel sensors which output analog signals corresponding to an image and having supporting circuitry for converting the analog signals to digital signals corresponding to the image;
decoder circuitry which receives the digital signals from the digital sensor array and converts the digital signals to digital values representative of the light intensity impinging upon the plurality of light sensitive digital pixel sensors, the decoder circuitry being formed on the substrate using a CMOS fabrication process;
a plurality of filters which receive the digital values from the decoder and from an at least one memory, the at least one memory being formed on the substrate using a CMOS fabrication process;
the at least one memory for storing the digital values provided by the filters, the at least one memory being formed on the substrate using a CMOS fabrication process;
a control circuit which selectively transfers the digital values from the plurality of filters to memory addresses within the at least one memory, the control circuit being formed on the substrate using a CMOS fabrication process; and
at least one programmable logic structure being formed on the substrate using a CMOS fabrication process.

12. The image sensor as in claim 11 wherein the at least one memory includes a data memory for storing the digital values, a threshold memory for storing threshold values for the digital values, and a time index memory for storing different time indexed values of the digital values.

13. The image sensor of claim 12 wherein the at least one programmable logic structure is selected from the group consisting of Simple Programmable Logic Devices, Complex Programmable Logic Devices, Field Programmable Gate Arrays, and Field Programmable Interconnect Devices.

14. The image sensor of claim 13 wherein the at least one programmable logic structure is configured to adjust pixel resolution of the image sensor.

15. The image sensor of claim 13 wherein the at least one programmable logic structure is configured to adjust bit precision of the plurality of digital pixel sensors of the digital sensor array.

16. The image sensor of claim 13 wherein the at least one programmable logic structure is configured to operate as a memory controller.

17. The image sensor of claim 13 wherein the at least one programmable logic structure is programmed to adjust the dynamic range of the digital sensor array.

18. The image sensor of claim 13 wherein the at least one programmable logic structure is programmed to adjust the resolution of the digital sensor array.

19. The image sensor of claim 13 wherein the at least one programmable logic structure is programmed to increase the processing speed of images detected with the digital sensor array.

20. The image sensor of claim 13 wherein the at least one programmable logic structure is programmed to accommodate customer specified functions.

21. The image sensor of claim 11 wherein the digital sensor array is configured so that each of the plurality of light sensitive digital pixel sensors which output analog signals corresponding to an image comprises a photosensor and the supporting circuitry for converting the analog signals to digital signals includes an analog-to-digital conversation circuit for each photosensor wherein the photosensor produces an analog signal when the image sensor is exposed to light, the analog-to-digital conversation circuits receiving the analog signals and generating a digital representation corresponding to the image.

22. An image sensor, comprising:
a substrate having formed thereon:
a digital sensor array having a plurality of digital pixel elements, each comprising a photosensor and an analog-to-digital conversation circuit, wherein the photosensor is configured to produce an analog signal when the image sensor is exposed to light, and wherein the analog-to-digital conversation circuit uses the analog signal to generate a digital representation thereof;
at least one programmable logic structure capable of being externally programmable to control operations of the digital sensor array so that the digital representation can be output from the image sensor as desired; and
at least one memory including:
a data memory for storing the digital signal information; and
a threshold memory for storing threshold values for the digital signal information.

23. The image sensor of claim 22 wherein clock circuitry is formed on the substrate and the at least one memory further includes a time index memory for storing different time indexed values of the digital signal information.

24. The image sensor of claim 23 wherein the at least one programmable logic structure is configured to operate as a memory controller.

25. The image sensor of claim 23 wherein the at least one programmable logic structure is programmed to provide timing control to be used in conjunction with the memory.

26. The image sensor of claim 22 wherein the at least one programmable logic structure is programmed to adjust the dynamic range of the digital sensor array.

27. The image sensor of claim 23 wherein the at least one programmable logic structure is programmed to adjust the resolution of the digital sensor array.

28. The image sensor of claim 23 wherein the at least one programmable logic structure is programmed to increase the processing speed of images detected with the digital sensor array.

29. The image sensor of claim 21 wherein the digital sensor array, the at least one memory, and the at least one programmable logic structure are each formed on the substrate using CMOS fabrication techniques.

30. An image sensor comprising:
   a substrate having formed thereon a digital sensor array;
   the digital sensor array including a plurality of light sensitive digital pixel sensors which output analog signals corresponding to an image and having supporting circuitry for converting the analog signals to digital signals corresponding to the image;
   decoder circuitry which receives the digital signals from the digital sensor array and converts the digital signals to digital values representative of the light intensity impinging upon the plurality of light sensitive digital pixel sensors;
   a plurality of filters which receive the digital values from the decoder and from an at least one memory;
   the at least one memory for storing the digital values provided by the filters;
   a control circuit which selectively transfers the digital values from the plurality of filters to memory addresses within the at least one memory; and
   at least one programmable logic structure being formed on the substrate.

31. The image sensor as in claim 30 wherein the at least one memory includes a data memory for storing the digital values, a threshold memory for storing threshold values for the digital values, and a time index memory for storing different time indexed values of the digital values.

32. The image sensor of claim 31 wherein the at least one programmable logic structure is selected from the group consisting of Simple Programmable Logic Devices, Complex Programmable Logic Devices, Field Programmable Gate Arrays, and Field Programmable Interconnect Devices.

33. The image sensor of claim 32 wherein the at least one programmable logic structure is configured to adjust pixel resolution of the image sensor.

34. The image sensor of claim 32 wherein the at least one programmable logic structure is configured to adjust bit precision of the plurality of digital pixel sensors of the digital sensor array.

35. The image sensor of claim 32 wherein the at least one programmable logic structure is configured to operate as a memory controller.

36. The image sensor of claim 32 wherein the at least one programmable logic structure is programmed to adjust the dynamic range of the digital sensor array.

37. The image sensor of claim 32 wherein the at least one programmable logic structure is programmed to adjust the processing speed of images detected with the digital sensor array.

38. The image sensor of claim 32 wherein the at least one programmable logic structure is programmed to accommodate customer specified functions.

* * * * *